June 11, 1929.　　C. E. KOHLBERGER　　1,717,228
FILM HOLDER
Filed April 10, 1928　　2 Sheets-Sheet 1

Charles E. Kohlberger
INVENTOR

June 11, 1929.  C. E. KOHLBERGER  1,717,228
FILM HOLDER
Filed April 10, 1928   2 Sheets-Sheet 2
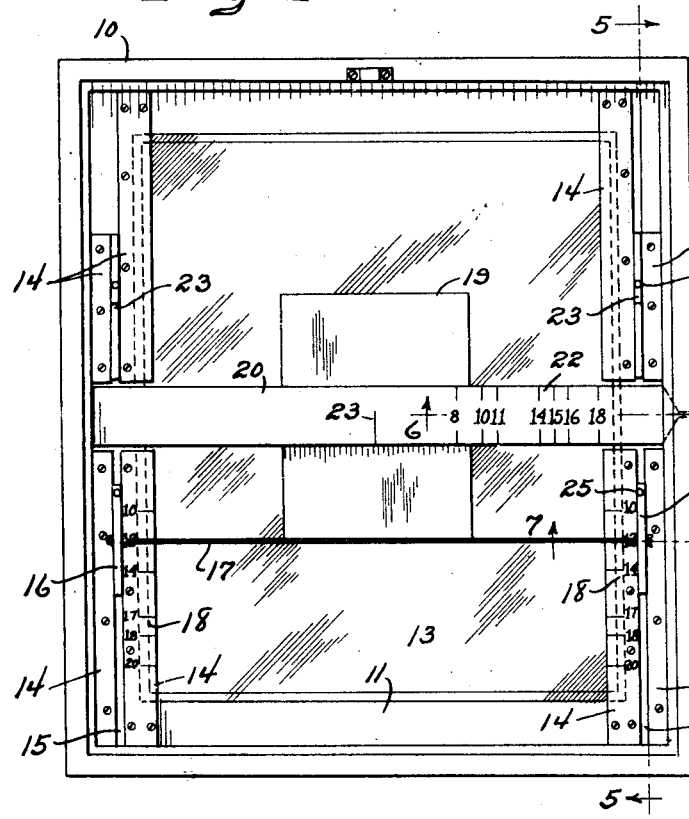
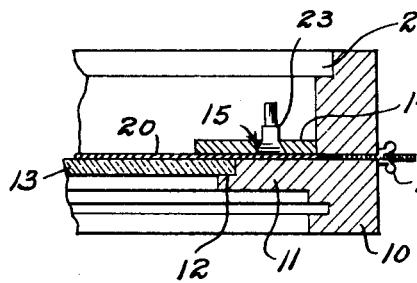
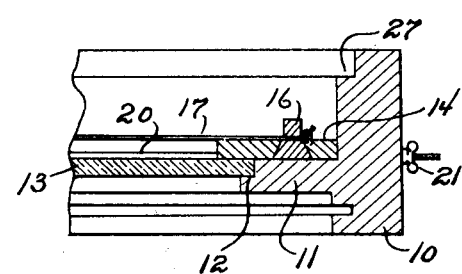
Charles E. Kohlberger
INVENTOR
BY Victor J. Evans
ATTORNEY
WITNESS Patented June 11, 1929.

1,717,228

UNITED STATES PATENT OFFICE.

CHARLES E. KOHLBERGER, OF NEW YORK, N. Y.

FILM HOLDER.

Application filed April 10, 1928. Serial No. 268,886.

This invention relates to holders for strip films or negative paper for photographic cameras, an object being to provide a holder by means of which various sizes of strip films or negative papers may be accurately positioned within the field of a camera.

Another object of the invention is the provision of a holder of the above character which may be quickly and conveniently loaded and unloaded, and which, when loaded will securely retain the film or paper in position.

With the above and other objects in view, the invention further includes the following novel features and details of construction, to be hereinafter more fully described, illustrated in the accompanying drawings and pointed out in the appended claims.

In the drawings:

Figure 4 is a rear elevation with the back of the holder removed.

Figure 5 is a sectional view taken substantially on the line 5—5 of Figure 4.

Figure 1:
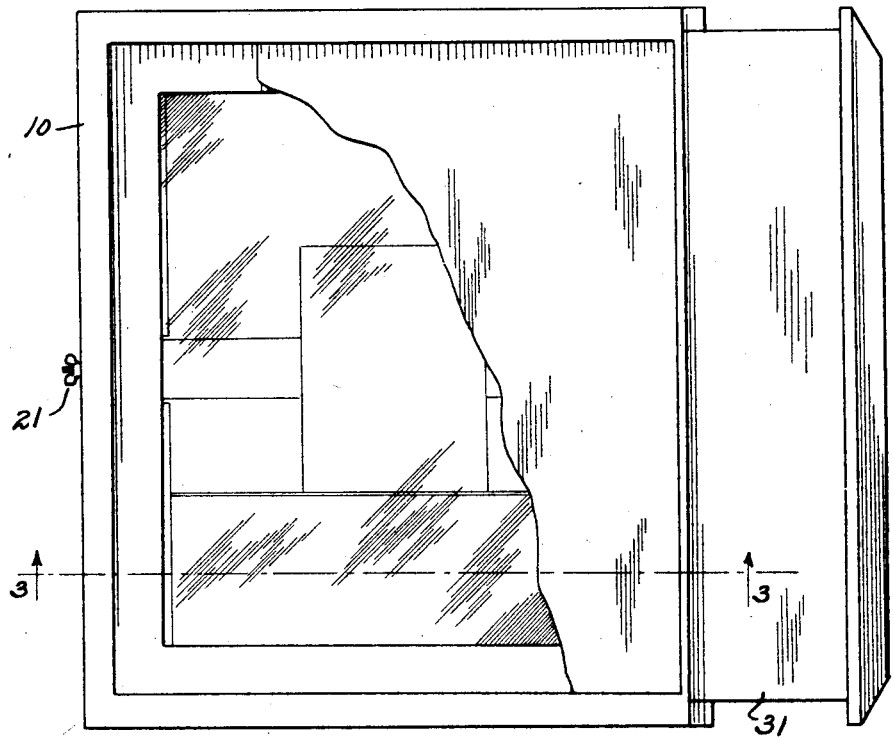
Figure 1 is an elevation of a holder constructed in accordance with the invention, the holder slide being shown partly withdrawn and a part of the slide broken away.
Figure 2:
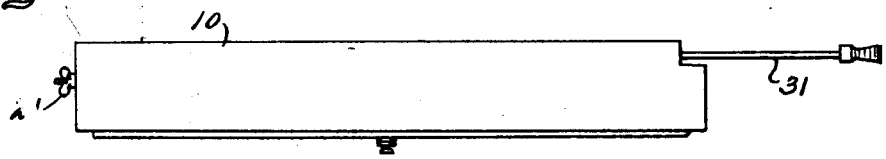
Figure 2 is a top plan view of the same.
Figure 3:
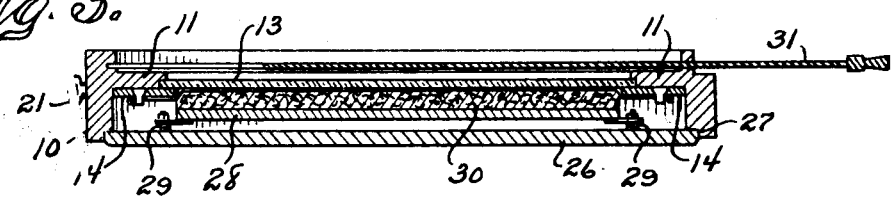
Figure 3 is a section on the line 3—3 of Figure 1.

Figures 6 and 7 are enlarged fragmentary sectional views taken respectively on the lines 6—6 and 7—7 of Figure 4.

Referring to the drawings in detail wherein like characters of reference denote corresponding parts, the reference character 10 indicates a frame which is provided with an inwardly extending bead 11 whose inner end is chamfered as at 12 to provide a seat for a glass panel 13. Secured to one face of the bead along the side members of the frame are spaced strips 14, the innermost strips overlapping the glass panel 13 to aid in holding the panel within the frame. Longitudinally extending grooves 15 are provided between the strips 14 and mounted for adjustment within these grooves are slide bars 16 to which are connected the opposite ends of a guide 17.

This guide extends across the panel 13 and is of a flexible resilient character and may consist of a spiral spring or a strip of rubber or other elastic material. The grooves are provided along one of their edges with indicia indicated at 18 by means of which the guide 17 may be positioned to aid in positioning a film or negative paper 19.

The strips 14 are interrupted centrally of the frame to accommodate a holder strip 20 and one end of this holder strip may be permanently secured to one of the side members of the frame 10 while its opposite end is connected with an adjusting element 21. The strip 20 is preferably made of elastic fabric so that by means of the element 21, the tension of this strip may be regulated so that it will engage the glass 13 and bear tightly upon the film or paper 19. The strip 20 is provided with indicia 22 and a centering mark 23, by means of which the film or paper 19 may be positioned.

In order to temporarily space the strip 20 from the glass 13 to facilitate the insertion of large films or papers, the groove 15 has slidingly mounted therein releasing members 23. These members 23 are in the form of slides which may be moved into engagement beneath the strip 20 near opposite ends thereof so as to force the strip upward or away from the glass and hold the same spaced from the glass while the film or paper is being inserted. The slides 23 and the slide bars 16 are each provided with knobs or finger pieces 24 and 25 respectively.

The holder includes a back 26 whose edges are adapted to be positioned within a seat 27 provided in the frame and this back carries a panel 28 which is movable with respect to the back and is yieldingly forced in a direction away from the back by means of springs 29. The panel is provided with a felt or other compressible facing 30 which is adapted to bear upon the film or paper 19 and upon the glass 13. The holder is provided with the usual slide 31.

It will be apparent from the foregoing description and accompanying drawings that the invention provides a holder which is capable of being loaded in an upright position and which may be more quickly loaded and unloaded than the type of holder which employs an adhesive composition coated on a glass plate, the latter type of holder requiring that the plate be removed to remove the negative paper or film from the holder, while, when a larger negative paper or film is to be used, the plate must be changed. It further obviates the use of the wet plate holder with its method of placing the paper or film between two pieces of glass and then placing the same within the holder.

The invention is susceptible of various changes in its form, proportions and minor details of construction and the right is herein reserved to make such changes as properly fall within the scope of the appended claims.

Having described the invention what is claimed is:—

1. In a holder of the character described, a frame having grooves extending longitudinally in opposite side members and having indicia along the grooves, a glass plate enclosed within the frame, slide bars mounted for adjustment longitudinally of the grooves, a guide having its opposite ends connected to the slide bars, a holding strip extending across the plate and having indicia thereon, a pressure back removably secured within the frame and adapted to press upon the holding strip, and a slide removably mounted in the frame.

2. In a holder of the character described, a frame having grooves extending longitudinally in opposite side members and having indicia along the grooves, a glass plate enclosed within the frame, slide bars mounted for adjustment longitudinally of the grooves, a guide having its opposite ends connected to the slide bars, a holding strip extending across the plate and having indicia thereon, pressure releasing members engageable with the holding strip to space the latter from the plate, a pressure back removably secured within the frame and adapted to press upon the holding strip, and a slide removably mounted in the frame.

3. In a holder of the character described, a frame having grooves extending longitudinally in opposite side members and having indicia along the grooves, a glass plate enclosed within the frame, slide bars mounted for adjustment longitudinally of the grooves, a guide having its opposite ends connected to the slide bars, a holding strip extending across the plate and adapted to bear upon said plate, said strip having indicia thereon, means to adjust the pressure of said strip, a pressure back removably secured within the frame and adapted to press upon the holding strip, and a slide removably mounted in the frame.

4. In a holder of the character described, a frame having grooves extending longitudinally in opposite side members and having indicia along the edges of the grooves, a glass plate enclosed within the frame, slide bars mounted for adjustment longitudinally of the grooves, a flexible guide having its opposite ends connected to the slide bars, a holding strip extending across the plate and having indicia thereon, a pressure back removably secured within the frame and adapted to press upon the holding strip, and a slide removably mounted in the frame.

5. In a holder of the character described, a frame having grooves extending longitudinally in opposite side members and having indicia along the grooves, a glass plate enclosed within the frame, slide bars mounted for adjustment longitudinally of the grooves, a guide having its opposite ends connected to the slide bars, a holding strip extending across the plate and having indicia thereon, pressure releasing members mounted for sliding movement within the grooves of the side members and engageable beneath the holding strip to space the latter from the plate, a pressure back removably secured within the frame and adapted to press upon the holding strip, and a slide removably mounted in the frame.

6. In a holder of the character described, a frame having grooves extending longitudinally in opposite side members and having indicia along the grooves, a glass plate enclosed within the frame, slide bars mounted for adjustment longitudinally of the grooves, a guide having its opposite ends connected to the slide bars, a holding strip extending across the plate and having indicia thereon, means to adjust the strip to regulate pressure of the same upon the plate, a pressure back removably secured within the frame and adapted to press upon the holding strip, and a slide removably mounted in the frame.

7. In a holder of the character described, a frame having grooves extending longitudinally in opposite side members and having indicia thereon, a glass plate enclosed within the frame, slide bars mounted for adjustment longitudinally of the grooves, a guide having its opposite ends connected to the slide bars, an elastic holding strip extending across the plate and having its opposite ends mounted in the frame, said strip having indicia thereon, means to adjust the tension of the strip, a pressure back removably secured within the frame and adapted to press upon the holding strip, and a slide removably mounted in the frame.

8. In a holder of the character described, a frame, spaced strips secured along opposite side members of the frame to assist in holding the plate in position and to define longitudinally extending grooves between the strips, said members having indicia along the edges of the grooves, slide bars mounted for adjustment longitudinally of the grooves, a guide having its opposite ends connected to the slide bars, a holding strip extending across the plate and having indicia thereon, a pressure back removably secured within the frame and adapted to press upon the holding strip, and a slide removably mounted in the frame.

In testimony whereof I affix my signature.

CHARLES E. KOHLBERGER.